United States Patent
Iwaida et al.

(10) Patent No.: US 6,847,517 B2
(45) Date of Patent: Jan. 25, 2005

(54) POLARIZABLE ELECTRODE FOR ELECTRIC DOUBLE LAYER CAPACITOR AND METHODS FOR PRODUCING POLARIZABLE ELECTRODE AND CAPACITOR

(75) Inventors: Manabu Iwaida, Saitama (JP); Shigeki Oyama, Shioya-gun (JP); Kenichi Murakami, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/721,502

(22) Filed: Nov. 26, 2003

(65) Prior Publication Data

US 2004/0114309 A1 Jun. 17, 2004

(30) Foreign Application Priority Data

Nov. 29, 2002 (JP) .................................. 2002-349176
Nov. 5, 2003 (JP) .................................. 2003-375630

(51) Int. Cl.$^7$ ................................................ H01G 9/00
(52) U.S. Cl. ..................... 361/502; 361/528; 29/25.03
(58) Field of Search ................................. 361/502, 508, 361/511, 512, 516; 29/25.03

(56) References Cited

U.S. PATENT DOCUMENTS

| 4,862,328 A | | 8/1989 | Morimoto et al. | |
|---|---|---|---|---|
| 5,303,118 A | * | 4/1994 | Saito et al. | 361/502 |
| 5,953,204 A | * | 9/1999 | Suhara et al. | 361/502 |
| 6,198,621 B1 | * | 3/2001 | Saito et al. | 361/502 |
| 6,614,646 B2 | * | 9/2003 | Bogaki et al. | 361/502 |

FOREIGN PATENT DOCUMENTS

JP   7-105316   11/1995

* cited by examiner

Primary Examiner—Anthony Dinkins
(74) Attorney, Agent, or Firm—Arent Fox PLLC (57) ABSTRACT

A polarizable electrode for an electric double layer capacitor includes an activated carbon powder, and a binder material mixed with the activated carbon. The amount of water contained in the polarizable electrode is 1500 ppm or less with respect to the weight of the polarizable electrode.

4 Claims, 6 Drawing Sheets

POLARIZABLE ELECTRODE FOR ELECTRIC DOUBLE LAYER CAPACITOR AND METHODS FOR PRODUCING POLARIZABLE ELECTRODE AND CAPACITOR

Priority is claimed on Japanese application No. 2002-349176, filed Nov. 29, 2002, the content of which is incorporated herein by reference.

BACKGROUND OF THE INVENTION

1. Field of the Invention

The present invention relates to polarizable electrodes for an electric double layer capacitor and to methods for production thereof, and relates to methods for producing the electric double layer capacitor.

2. Description of Related Art

An electric double layer capacitor is used as a backup power source, a car battery, etc., attributed to its large farad level capacity and excellent charging and discharging characteristics.

An electric double layer capacitor includes a pair of polarizable electrodes, a separator disposed between the pair of polarizable electrodes, and an electrolyte. Each of the members of the pair of polarizable electrodes, which are separated by the separator, functions as an anode or a cathode. As a material for the polarizable electrodes of the electric double layer capacitor, activated carbon having fine pores is generally used. An electric double layer is formed when ions contained in the electrolyte are absorbed in the fine pores of the activated carbon so as to form the anode and cathode of the capacitor.

As a method for producing the above-mentioned polarizable electrodes, Japanese Patent Application, Second Publication, No. Hei 7-105316 discloses a method which includes a step of mixing an activated carbon powder, a fluorine-containing polymer resin, and a liquid lubricant (a solvent for lubrication) to form a sheet of the mixture, and a step of subsequently removing the liquid solvent by heating, extraction, and so forth.

Since an electric double layer capacitor which includes the activated carbon as an electrode material and an organic electrolyte, is generally used when it is charged to the level of about 2.5V, there is a danger that the internal resistance of the capacitor will increase due to a reaction between water and the electrolyte if water remains in the capacitor. Accordingly, when an electric double layer capacitor is produced, it is necessary to decrease the amount of water in the capacitor to be as low as possible.

Since the activated carbon has an excellent property of absorbing chemical substances, it is assumed that water components in the capacitor are present in a state being absorbed by the activated carbon. Accordingly, the polarizable electrodes may be sufficiently dried in order to decrease the amount of water in the capacitor. However, there is a danger that the strength of the electrodes may be reduced, if a drying process is carried out excessively, due to thermal denaturing of a binder resin contained in the polarizable electrodes.

Also, there in no disclosure in the above Japanese Patent Application, Second Publication, No. Hei 7-105316 about practical manners and degree of decreasing the amount of water.

SUMMARY OF THE INVENTION

The present invention was made in consideration of the above-mentioned situation, and includes as objects to provide a polarizable electrode having a low amount of remaining water and a method for production thereof, and a method for producing an electric double layer capacitor.

In order to achieve the above object, the present invention provides a polarizable electrode (for instance, a polarizable electrode 11 explained in the following embodiment) for an electric double layer capacitor, including: an activated carbon powder (for instance, an activated carbon powder 1 explained in the following embodiment); and a binder material (for instance, PTFE explained in the following embodiment) mixed with the activated carbon, wherein an amount of water contained in the polarizable electrode is 1500 ppm or less with respect to the weight of the polarizable electrode.

According to the above polarizable electrode for an electric double layer capacitor of the invention, since the amount of water contained is 1500 ppm or less with respect to the weight of the polarizable electrode, there is no danger that the formation of an electric double layer by the absorption of electrolyte ions will be prevented by residual water. Accordingly, the electric double layer is sufficiently formed in the fine pores of the activated carbon powder to reduce the diffusive resistance between the activated carbon powder and the electrolyte.

It is not preferable that the water content exceed 1500 ppm since the formation of the electric double layer by the absorption of electrolyte ions is prevented by the residual water, increasing the diffusive resistance between the activated carbon powder and the electrolyte, and the performance of the polarizable electrode for the electric double layer capacitor would be deteriorated.

Also, according to another aspect of the present invention, in the above-mentioned polarizable electrode for an electric double layer capacitor, the amount of water contained in the polarizable electrode is within a range between 250 ppm and 1500 ppm with respect to the weight of the polarizable electrode.

According to the above polarizable electrode for electric double layer capacitor of the invention, since the amount of water contained ranges from 250 ppm to 1500 ppm with respect to the weight of the polarizable electrode, there is no danger that the formation of an electric double layer by the absorption of electrolyte ions will be prevented by residual water. Accordingly, the electric double layer is sufficiently formed in the fine pores of the activated carbon powder to reduce the diffusive resistance between the activated carbon powder and the electrolyte.

As mentioned above, it is not preferable that the water content exceed 1500 ppm since the formation of the electric double layer by the absorption of electrolyte ions is prevented by the residual water, increasing the diffusive resistance between the activated carbon powder and the electrolyte, and the performance of the polarizable electrode for the electric double layer capacitor would be deteriorated.

Moreover, although it is most preferable that the water content in the polarizable electrode be decreased to 0 ppm, it is difficult, in practice, to realize a concentration of less than 250 ppm due to the high absorption property of the activated carbon. Furthermore, there is a danger that the strength of the polarizable electrode will be reduced if the drying process is excessively carried out due to thermal deformation of the binder materials contained in the polarizable electrode. Accordingly, if the water content ranges from 250 to 1500 ppm, the formation of an electric double layer is not significantly prevented and the performance of the electrode will not be significantly deteriorated. In addition, the strength of the electrode will not be reduced at that concentration.

The present invention also provides a method for manufacturing a polarizable electrode for an electric double layer capacitor, including the steps of: mixing an activated carbon powder (for instance, an activated carbon powder 1 explained in the following embodiment) and a binder material (for instance, PTFE 2 explained in the following embodiment) with an organic solvent for lubrication (for instance, IPA 3 explained in the following embodiment) to form a polarizable electrode (this step may be referred to as an electrode forming process including a raw material mixing step ST1 through a sheeting-rolling step ST4 explained in the following embodiment); and removing water which remains in the polarizable electrode by vacuum drying until an amount of water contained in the electrode is reduced to 1500 ppm or less with respect to a weight of the polarizable electrode (this step may be referred to as a vacuum drying step ST8 explained in the following embodiment).

Also, it is preferable that the amount of water remaining in the electrode be reduced range from 250 ppm to 1500 ppm with respect to the weight of the polarizable electrode.

Moreover, it is possible to carry out an electrode drying step (for instance, a continuous drying step ST6 explained in the following embodiment), after the electrode forming process, in which water is removed by heating.

According to the above method for manufacturing a polarizable electrode, since the water content of the polarizable electrode is reduced by removing the residual water to reach a level of 1500 ppm or less, it becomes possible to prevent the increase of the internal pressure of the capacitor. Also, there is no danger that the formation of the electric double layer by the absorption of the electrolyte ions will be prevented by the residual water content. In this manner, the electric double layer is sufficiently formed in the fine pores of the activated carbon powder, and a polarizable electrode having a small diffusive resistance between the activated carbon powder and the electrolyte is obtained.

Moreover, although it is most preferable that the water content in the polarizable electrode be decreased to 0 ppm, it is difficult, in practice, to realize a concentration of less than 250 ppm due to the high absorption property of the activated carbon. Furthermore, there is a danger that the strength of the polarizable electrode will be reduced if the drying process is excessively carried out due to thermal deformation of binder materials contained in the polarizable electrode. Accordingly, if the water content ranges from 250 to 1500 ppm, the formation of an electric double layer is not significantly prevented and the performance of the electrode will not be significantly deteriorated. In addition, the strength of the electrode will not be reduced at that concentration.

Also, if the continuous drying step is carried out after the electrode forming process in which water is removed by heat, it becomes possible to remove most of the water content prior to the vacuum drying process. In this manner, water which was not removed by the electrode drying process may be readily removed by the vacuum drying process until it is reduced to a level of 1500 ppm or less. That is, the time required for the vacuum drying process can be shortened. Accordingly, there is no danger that the binder materials contained in the polarizable electrodes will be deteriorated by thermal deformation and that the strength of the polarizable electrode will be reduced.

The present invention also provides a method for manufacturing an electric double layer capacitor (for instance, an electric double layer capacitor 17 explained in the following embodiment) including a pair of polarizable electrodes (for instance, polarizable electrodes 11 and 11 explained in the following embodiment) formed by an activated carbon powder (for instance, an activated carbon powder 1 explained in the following embodiment) and a binder material (for instance, PTFE 2 explained in the following embodiment), a separator (for instance, a separator 13 explained in the following embodiment) disposed between the pair of polarizable electrodes, and an electrolyte, the method including the steps of: mixing the activated carbon powder and the binder material with an organic solvent for lubrication (for instance, IPA 3 explained in the following embodiment) to form the pair of polarizable electrodes (this step may be referred to as an electrode forming process including a raw material mixing step ST1 through a sheeting-rolling step ST4 explained in the following embodiment); placing the separator between the pair of polarizable electrodes and obtaining a wound body (for instance, a wound body 14 explained in the following embodiment) by winding the separator together with the pair of polarizable electrodes (this step may be referred to as a winding step ST7 explained in the following embodiment); after disposing the wound body in a capacitor container (for instance, a capacitor container 15 explained in the following embodiment), removing water which remains in the wound body by vacuum drying until an amount of water contained in the wound body is reduced to 1500 ppm or less with respect to a weight of the polarizable electrode (this step may be referred to as a vacuum drying step ST8 as explained in the following embodiment); and introducing the electrolyte into the capacitor container (the step may be referred to as a filling step ST9 as explained in the following embodiment).

Also, it is preferable that the amount of water remaining in the electrode be reduced to range from 250 ppm to 1500 ppm with respect to the weight of the polarizable electrode.

Moreover, it is possible to carry out an electrode drying step (for instance, a continuous drying step ST6 explained in the following embodiment), after the electrode forming process, in which water is removed by heating.

According to the above method for manufacturing the electric double layer capacitor, since the water content of the polarizable electrode is reduced by removing the residual water to reach the level of 1500 ppm or less, it becomes possible to reduce the water content in the polarizable electrodes so that there is no danger that the formation of the electric double layer by the absorption of the electrolyte ions will be prevented by the residual water. In this manner, electric double layer is sufficiently formed in the fine pores of the activated carbon, and a polarizable electrode having a small diffusive resistance between the activated carbon powder and electrolyte is obtained.

Also, if the vacuum drying step is carried out just before the filling process, water components contained in the atmosphere of the series of manufacturing processes will not reabsorbed by the polarizable electrodes.

Moreover, although it is most preferable that the water content in the polarizable electrode be decreased to 0 ppm, it is difficult, in practice, to realize a concentration of less than 250 ppm due to the high absorption property of the activated carbon. Furthermore, there is a danger that the strength of the polarizable electrode is reduced if the drying process is excessively carried out due to thermal deformation of binder materials contained in the polarizable electrode. Accordingly, if the water content ranges from 250 to 1500 ppm, the formation of electric double layer is not significantly prevented and the performance of the electrode will not be significantly deteriorated. In addition, the strength of the electrode will not be reduced at that concentration.

Also, if the electrode drying step is carried out after the electrode forming process in which water is removed by heat, it becomes possible to remove most of the water content prior to the vacuum drying process. In this manner, water which was not removed by the electrode drying process may be readily removed by the vacuum drying process until it is reduced to the level of 1500 ppm or less.

That is, the time required for the vacuum drying process can be shortened. Accordingly, there is no danger that the binder materials contained in the polarizable electrodes are deteriorated by thermal deformation and that the strength of the polarizable electrode is reduced.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, embodiments of the present invention will be described with reference to the accompanying drawings.

A method for manufacturing an electric double layer capacitor according to the present invention mainly includes an electrode forming process in which an activated carbon powder and a binder material are mixed with an organic solvent for lubrication to produce sheet-shaped electrodes, a winding process in which a separator is placed between the electrodes and is rolled together to obtain a wound body, a vacuum drying process in which residual water contained in the wound body is reduced to 1500 ppm or less by vacuum drying after the wound body is placed in a capacitor condenser, and a filling process in which an electrolyte is filled in the capacitor container. Note that it is possible to carrying out an electrode drying process, between the electrode forming process and the winding process, in which water and the organic solvent for lubrication are removed by heat. FIGS. 1A to 3D are diagrams for showing the details of each process according to the present invention which will be explained as follows.

FIGS. 1A to 1D are diagrams for explaining the electrode forming process in which an activated carbon, a binder material, and an organic solvent for lubrication are mixed and formed into sheets. The electrode forming process includes a raw material mixing step ST1 shown in FIG. 1A, a mixing step ST2 shown in FIG. 1B, a pulverization step ST3 shown in FIG. 1C, and a sheeting-rolling step ST4 shown in FIG. 1D.

Figure 1A:
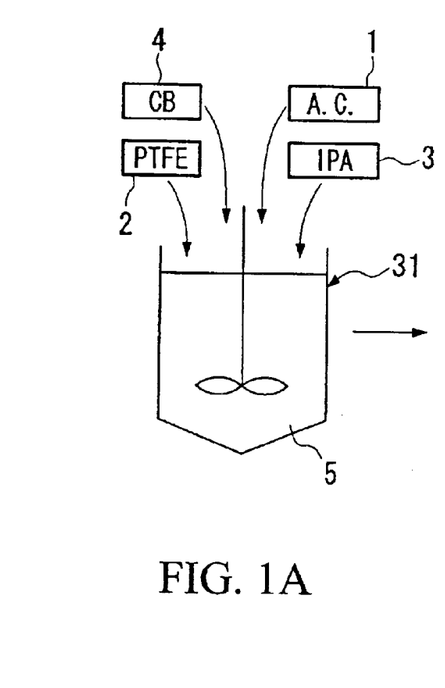
FIGS. 1A to 1D are diagrams for explaining the method for manufacturing an electric double layer capacitor according to an embodiment of the present invention.

Firstly, as shown in FIG. 1A, materials for producing the polarizable electrode are introduced and mixed in an agitator 31 to obtain a mixed powder 5 in the raw material mixing step ST1. The raw materials introduced into the agitator 31 include an activated carbon powder 1, polyfluoroethylene 2 (hereinafter abbreviated as PTFE 2), isopropyl alcohol (hereinafter abbreviated as IPA 3), and a carbon black 4 (hereinafter abbreviated as a CB 4). As the agitator 31, a general uniaxial agitator with a paddle may be suitably employed.

The activated carbon 1 may be obtained by calcinating and carbonizing a graphitization-resistant material, such as a phenol resin, and subsequently subjecting the obtained substance to an activation process using water vapor, etc. Also, the PTFE (a binder material) is fiberized in the subsequent mixing step ST2 to bind the activated carbon powder 1, etc. Moreover, the IPA 3 (an organic solvent for lubrication) is used to smoothly carry out mixing, etc., of the raw materials in the step ST1 and the subsequent mixing step ST2. Furthermore, the CB4 is used to impart an electroconductivity to the polarizable electrodes. Note that the organic solvent for lubrication is not limited to the IPA, and other alcohols and ketones may be used. Also, Acetyleneblack, Ketjenblack, etc., may be used instead of the CB4.

As a mixing rate for each of the raw materials, it is preferable, for example, to use 96–50 parts by weight of the activated carbon 1, 2 to 20 parts by weight of the PTFE 2, 2 to 80 parts by weight of IPA 3, and 0 to 20 parts by weight of CB4.

Figure 1B:
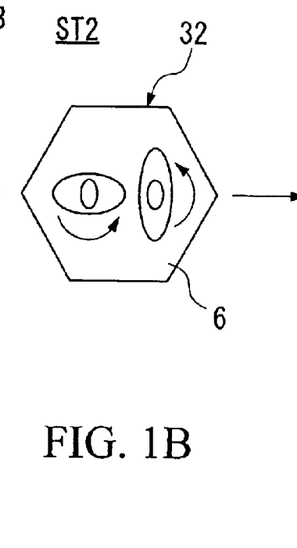

In the mixing step ST2, as shown in FIG. 1B, the mixed powder 5 obtained in the raw material mixing step ST1 is introduced and mixed in a mixer 32 so as to apply a shearing force to the mixed powder 5. In this manner, the PTFE 2 is fiberized and the mixed powder 5 is made into an agglomeration 6. As the mixer 32, a general biaxial mixer, for example, may be suitably employed.

Figure 1C:
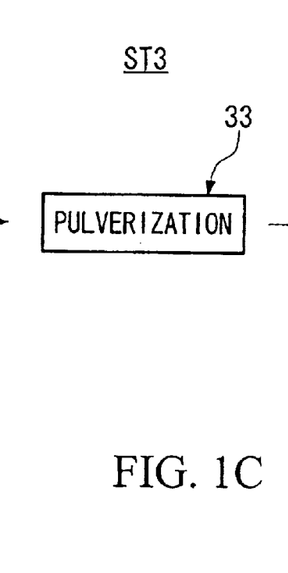

In the pulverization step ST3, as shown in FIG. 1C, the agglomeration 6 obtained in the mixing step ST2 is pulverized using a grinder 33 to obtain a granule. It is preferable, for example, to pulverize the agglomeration 6 until granules having diameters of about 0.1–1 mm is obtained. As the grinder 33, a general shearing type grinder, etc., may be suitably employed.

Figure 1D:
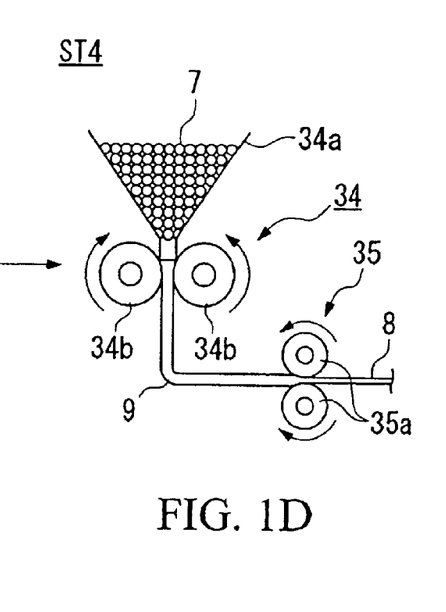

In the sheeting-rolling step ST4, as shown in FIG. 1D, granules 7 obtained in the pulverization step ST3 are made into a sheet having a predetermined thickness by a rolling process to obtain a sheet 8 for electrodes. In order to make the granules 7 into a sheet, a sheet-forming device 34 as shown in FIG. 1D may be employed. The sheet-forming device 34 includes a hopper into which the granules 7 are introduced and a pair of rollers 34*b* and 34*b* which are disposed at the outlet of the hopper 34*a*. The granule 7 is supplied between the pair of rollers 34*b* and 34*b* through the exit of the hopper 34*a* and is compressed to obtain a sheet 9. Then, the sheet 9 is supplied to a rolling device 35 having a pair of rollers 35a and 35a to obtain the sheet 8 for electrodes. It is preferable to carry out the rolling process until the thickness of the sheet 8 for electrodes reaches about 130 to 160 $\mu$m.

Figure 2A:
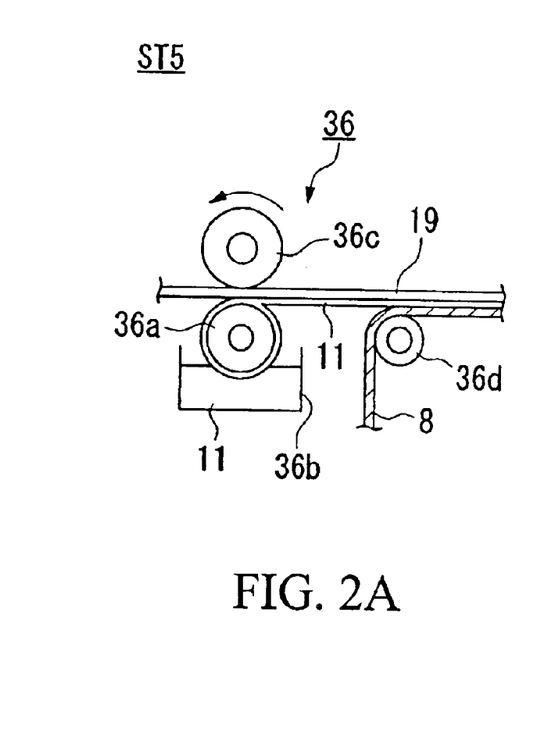
FIGS. 2A to 2C are diagrams for explaining the method for manufacturing an electric double layer capacitor according to an embodiment of the present invention.
Figure 2B:
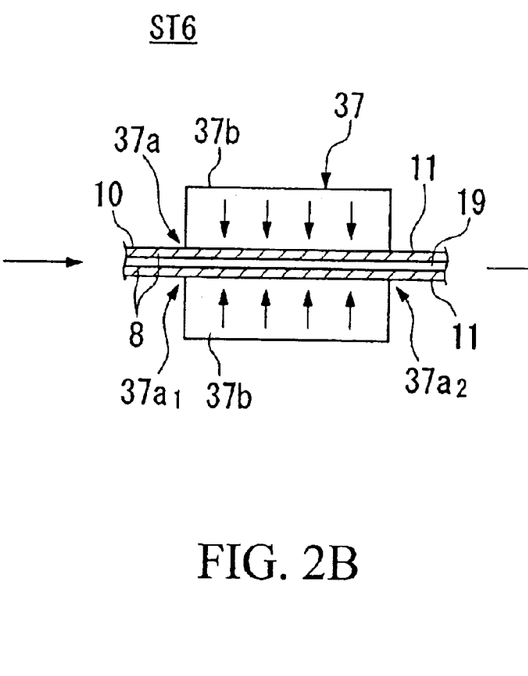
Figure 2C:
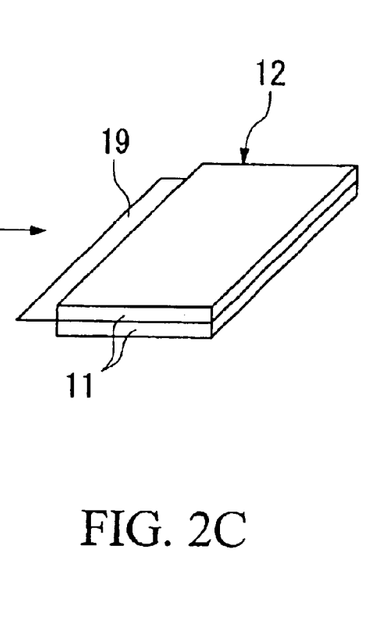

FIGS. 2A to 2C show the electrode drying process in which water and IPA 3 (organic solvent for lubrication) are thermally removed to obtain a polarizable electrode. The electrode drying process includes a current collector bonding step ST5 shown in FIG. 2A and a continuous drying step ST6 shown in FIG. 2B. Also, FIG. 2C shows a perspective view of an electrode obtained. Note that although the continuous drying step ST6 is not an essential step according to the present invention, it becomes possible, by carrying out this step, to sufficiently decrease amounts of water and organic compounds contained in the polarizable electrodes in advance and to shorten a drying time in a subsequent vacuum drying step.

In the current collector bonding step ST5 shown in FIG. 2A, a current collector 19 including aluminum foil is adhered to the sheet 8 for electrodes obtained in the sheeting-rolling step ST4 to produce an electrode sheet 10. An adhering device 36 used in this step includes a transfer roller 36a, an adhesive container 36b, a current collector feeding roller 36c, and a sheet feeding roller 36d. The transfer roller 36a applies an adhesive 11 onto the current collector 19. The adhesive container 36b is filled with the adhesive to supply the adhesive to the transfer roller 36a. The current collector feeding roller 36c is disposed so as to oppose the transfer roller 36a. The transfer roller 36a and the current collector feeding roller 36c rotate to feed the current collector 19, and at that time the adhesive 11 is applied onto one surface of the current collector 19 by the transfer roller 36a. Then, the sheet 8 for electrodes supplied by the sheet feeding roller 36d is adhered onto the surface of the current collector 19 via the adhesive 11 as shown in FIG. 2A. In this manner, the electrode sheet 10 is obtained. Although FIG. 2A shows a state in which the sheet 8 for electrodes is attached to only one side of the current collector 19, the sheet 8 for electrodes may be attached to the other side of the current collector 19 as well by repeating the step ST5 to obtain the electrode sheet 10 in which the activated carbon powder 1 is disposed at both sides of the current collector 9.

After this, in the continuous drying step ST6 shown in FIG. 2B, the electrode sheet 10 obtained in the current collector bonding step ST5 is introduced into a continuous drying furnace 37 and is heated to remove water and IPA 3 contained in the electrode sheet 10. Also, the adhesive 11 which was used to adhere the current collector 19 to the sheet 8 for electrodes in the previous step ST5, is dried. The continuous drying furnace 37 includes a transfer path 37a through which the electrode sheet 10 is transferred and a pair of heating devices 37b and 37b which are disposed so as to sandwich the electrode sheet 10. The healing devices 37b and 37b are placed so as to extend along the transfer direction of the electrode sheet 10. Also, various types of drying devices, such as a forced-air drying device and an infrared drying device, may be adapted as the heating devices 37b and 37b. However, in any of the drying type devices, it is preferable that the device be capable of heating the electrode sheet 10 to the boiling point of water or of the organic solvent for lubrication (IPA 3), whichever is higher. For example, when IPA is used as the organic solvent for lubrication, the device should be able to heat the electrode sheet 10 to a temperature of about 150° C. which is the boiling point of IPA.

In order to dry the electrode sheet 10, the electrode sheet 10 is transferred from an upstream side 37a1 of the transfer path 37a in the continuous drying furnace 37 and is passed between the pair of heating devices 37b and 37b as shown in FIG. 2B so that water and IPA are removed.

If the continuous drying step ST6 is not carried out, water may remain in the electrode sheet 10 and almost all IPA 3 may remain as residual IPA.

On the other hand, if the continuous drying step ST 6 is carried out, most of the water and IPA 3 contained in the electrode sheets 10 is removed by heat, and only a part thereof may remain in the electrode sheet 10 as residual water and IPA. Also, in the continuous drying step ST6, a minute part of the residual IPA is etherized at the surface of the activated carbon powder to produce diisopropylether (hereinafter abbreviated as DIPE) and the residual IPA may be dehydrated within a molecule to generate propylene. These thermal denatured substances may also remain in the electrode sheet 10. In this specification, "residual IPA", "DIPE (thermally denatured substance)", and "propylene (thermally denature substance)" are referred to as "organic compounds".

Note that it is preferable that the amount of organic compounds remaining in the electrode sheet 10 after carrying out the continuous drying process ST6 be 800 (ppm) or less. If the amount of remaining organic compounds is 800 (ppm) or less, it becomes possible to surely decrease the amount of organic compounds remains in a polarizable electrode to 300 (ppm) or less even if the drying time in the vacuum drying step is shortened.

Thereafter, the electrode sheet 10 is cut to a predetermined length so that an electrode 12 in which the polarizable electrode 11 is attached to each side of the current collector 19 is obtained as shown in FIG. 2C.

FIGS. 3A to 3D show a winding step S17, a vacuum drying step ST8, and a filling step ST9.

Figure 3A:
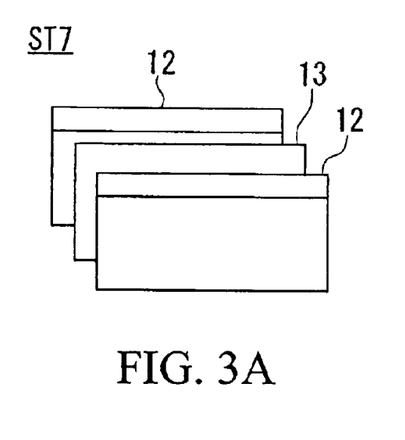
FIGS. 3A to 3D are diagrams for explaining the method for manufacturing an electric double layer capacitor according to an embodiment of the present invention.
Figure 3B:
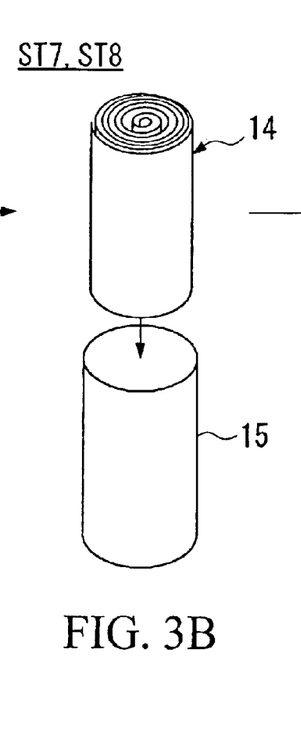

In the winding step ST7 shown in FIGS. 3A and 3B, the electrodes 12 (polarizable electrode 11) are placed so as to sandwich a separator 13 and are rolled to obtain a wound body 14. That is, as shown in FIG. 3A, the separator 13 is disposed between the pair of electrodes 12 and 12, and the electrodes 12 and 12 and the separator 13 are rolled together to form the wound body 14 as show in FIG. 3B.

Note that since the winding step S1 is carried out under the atmosphere of a series of processes for manufacturing the electric double layer capacitor, components of the electrolyte, for example, propylene carbonate (hereinafter abbreviated as PC), water, acetone, alcohol, etc., which are evaporated into the atmosphere, may be reabsorbed by the activated carbon powder. In this specification, these reabsorbed evaporated components (excluding water) are also referred to as "organic compounds" as well as the above-mentioned residual IPA, DIPE, propylene.

Figure 3C:
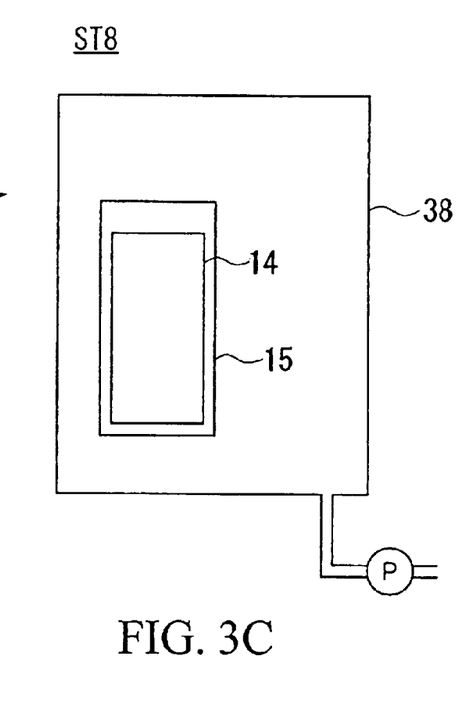

In the subsequent vacuum drying step ST8 shown in FIGS. 3B and 3C, the wound body 14 obtained in the winding step ST7 is inserted into a capacitor container 15, and water remaining in the wound body 14 is removed by vacuum drying until its concentration reaches 1500 ppm or less, preferably in a range from 250 ppm to 1500 ppm. At the same time, the organic compounds are removed by vacuum drying until their concentration reaches 300 ppm or less, preferably in a range from 150 ppm to 300 ppm.

That is, as shown in FIG. 3B, after the wound body 14 in inserted into the metallic capacitor container 15 of a hollow cylindrical shape, the capacitor container 15 together with the wound body 14 is placed in a vacuum dryer 38 as shown in FIG. 3C and the wound body 14 (polarizable electrode 11) is vacuum dried under a pressure of 10 Pa or less at a temperature of between 120° C. and 200° C. It is preferable that the drying time be set at 40 hours or longer if the continuous drying step ST6 is carried out, and be set at 72 hours or longer if the continuous drying step ST6 is not performed. The amount of water remaining in the polarizable electrode 11 is reduced by the vacuum drying to 1500 ppm or less, preferably in a range from 250 ppm to 1500 ppm, with respect to the weight of the polarizable electrode 11. Also, at the same time, the amount of organic compounds remaining in the polarizable electrode 11 is reduced by the vacuum drying to 300 ppm or less, preferably in a range between 150 ppm to 300 ppm, with respect to the weight of the polarizable electrode 11. That is, the vacuum drying is carried out until the total amount of reabsorbed components, such as PC, acetone, and alcohol, and the residual IPA, DIPE, and propylene reaches a concentration of 300 ppm or less.

It is not preferable that the water content exceed 1500 ppm since the formation of an electric double layer by the absorption of electrolyte ions is prevented by the remaining water, increasing the diffusive resistance between the activated carbon powder 1 and the electrolyte, and the performance as the polarizable electrode 11 of the electric double layer capacitor would be deteriorated.

Also, although it is most preferable that the amount of water in the polarizable electrode be decreased to 0 ppm, it is difficult, in practice, to realize a concentration of less than 250 ppm due to a high absorption property of the activated carbon. In addition, there is a danger that the strength of the polarizable electrode will be reduced, if the drying process is excessively carried out, due to thermal deformation of binder materials contained in the polarizable electrode. Accordingly, if the water content is in a range from 250 to 1500 ppm, the formation of an electric double layer is not significantly prevented and the performance of the electrode will not be significantly deteriorated. In addition, the strength of the electrode will not be reduced at that concentration of water.

Moreover, it is not preferable that the concentration of organic compounds exceed 300 ppm since the formation of an electric double layer by the absorption of electrolyte ions is prevented, increasing the diffusive resistance between the activated carbon powder 1 and the electrolyte, and the performance of the polarizable electrode 11 of the electric double layer capacitor would be deteriorated. Also, although it is most preferable that the concentration of organic compounds be decreased to 0 ppm, it is difficult, in practice, to realize a concentration of less than 150 ppm due to a high absorption property of the activated carbon. Accordingly, if the concentration of organic compounds is in a range from 150 to 300 ppm, the formation of an electric double layer is not significantly prevented and the performance of the polarizable electrode will not be significantly deteriorated by the increase of the diffusive resistance between the activated carbon powder 1 and the electrolyte.

Figure 3D:
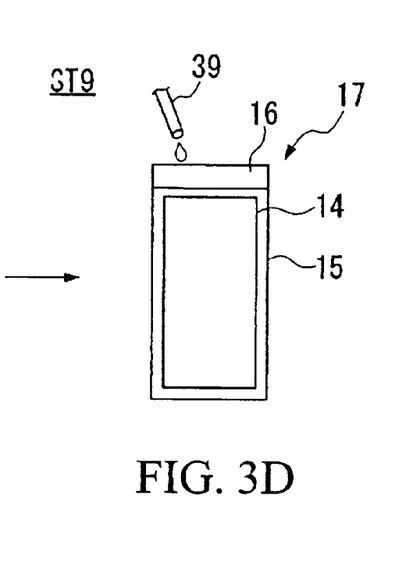

In the filling step ST9 shown in FIG. 3D, the electrolyte is introduced through a nozzle 39, and a sealing member 16 is attached to the capacitor container 15 by welding, etc. In this manner, an electric double layer capacitor 17 is obtained. Note that a tertiary ammonium salt may be dissolved in PC to be used as the electrolyte.

The above-mentioned polarizable electrode 11 of an electric double layer capacitor includes the activated carbon powder 1 mixed with PTFE 2, and has a water content of 1500 ppm or less. Accordingly to the polarizable electrode 11, there is no danger that the formation of the electric double layer will be prevented by the absorption of electrolyte ions during a charging operation of the capacitor. In this manner, the electric double layer is sufficiently formed in the fine pores of the activated carbon powder, and the diffusive resistance between the activated carbon powder and the electrolyte decreases.

Note that although it is most preferable that the water content of the polarizable electrode be 0 ppm as mentioned above, it is difficult, in practice, to realize a concentration of less than 250 ppm due to the high absorption property of the activated carbon. If the water content is in a range from 250 to 1500 ppm, the formation of an electric double layer is not significantly prevented and the performance of the electrode will not be significantly deteriorated by an excessive diffusive resistance between the activated carbon powder and the electrolyte.

Moreover, since the concentration of residual organic compounds such as IPA, DIPE, propylene, PC, acetone, and alcohol, contained in the polarizable electrode 11 is 300 ppm or less, the probability that the formation of electric double layer by the absorption of electrolyte ions will be prevented by the organic compounds which remain in the fine pores of the activated carbon powder is reduced. Accordingly, in this manner, an electric double layer is sufficiently formed within the fine pores of the activated carbon powder, and it becomes possible to reduce the diffusive resistance between the activated carbon powder and the electrolyte. Although it is most preferable that the concentration of organic compounds be 0 ppm, it is difficult, in practice, to realize a concentration of less than 150 ppm due to the high absorption property of the activated carbon. If the concentration of organic compounds is in a range from 150 to 300 ppm, the formation of an electric double layer is not significantly prevented and the performance of the electrode will not be significantly deteriorated by the increase of diffusive resistance between the activated carbon powder and the electrolyte.

Also, according to the above method for producing the polarizable electrode, since the water content of the polarizable electrode is reduced by removing the residual water, which still remains after the electrode forming process of ST1 to ST4, to reach a level of 1500 ppm or less during the vacuum drying step ST8, it becomes possible to prevent the increase of the internal pressure of the capacitor. Also, there is no danger that the formation of an electric double layer by the absorption of the electrolyte ions will be prevented by the residual water content. In this manner, the electric double layer is sufficiently formed in the fine pores of the activated carbon powder, and a polarizable electrode having a small diffusive resistance between the activated carbon powder and the electrolyte is obtained.

Moreover, although it is most preferable that the water content in the polarizable electrode be decreased to 0 ppm, it is difficult, in practice, to realize a concentration of less than 250 ppm due to the high absorption property of the activated carbon. Furthermore, there is a danger that the strength of the polarizable electrode will be reduced, if the drying process is excessively carried out, due to thermal deformation of binder materials contained in the polarizable electrode. Accordingly, if the water content is in a range from 250 to 1500 ppm, the formation of an electric double layer is not significantly prevented and the performance of the electrode will not be significantly deteriorated. In addition, the strength of the electrode will not be reduced at that concentration.

Also, since the amounts of organic compounds remaining in the fine pores of the activated carbon powder are reduced by removing the residual IPA, which still remains after the electrode forming process of ST1 to ST4, to reach a level of 300 ppm or less during the vacuum drying step ST8, there is no danger that the formation of the electric double layer by the electrolyte ions absorbed by the activated carbon powder will be prevented. In this manner, an electric double layer is sufficiently formed in the fine pores of the activated carbon powder, and the polarizable electrode 11 having a small diffusive resistance between the activated carbon powder and the electrolyte is obtained.

Moreover, if the continuous drying step ST6 is carried out after the electrode forming process of ST1 to ST4, it becomes possible to remove most of the water content and residual IPA prior to the vacuum drying process. In this manner, water and the residual IPA which were not removed by the electrode drying process, and the organic compounds, such as a side-product DIPE, may be readily removed by the vacuum drying process. Accordingly, there is no danger that the binder materials contained in the polarizable electrodes will be deteriorated by thermal deformation and that the strength of the polarizable electrode will be reduced.

Furthermore, according to the above method for producing the electric double layer capacitor 17, there is no danger that water and organic compounds contained in the atmosphere of a series of manufacturing process will be reabsorbed by the polarizable electrode 11 since the vacuum drying step ST8 is performed just before the filling step ST9.

In addition, according to the above method for producing the electric double layer capacitor 17, at least residual water and the residual IPA are absorbed by the polarizable electrode 11 prior to the vacuum drying step ST8. Moreover, DIPE, which is a thermally denatured substance generated by heating the residual IPA, is absorbed at the initial stage of the vacuum drying step ST 8, and a minute amount of volatile organic compounds and water contained in the atmosphere of the series of the manufacturing process are also absorbed. By removing these substances during the vacuum drying process, the electric double layer capacitor 17 having a low internal pressure in which an electric double layer is sufficiently formed in the fine pores of the activated carbon powder and the diffusive resistance between the activated carbon powder and the electrolyte is small, may be obtained.

EXAMPLES

Example 1

Studies on Drying Conditions in the Vacuum Drying Process (Manufacture of electric double layer capacitor of Example 1)

Activated carbon powder was prepared as follows. First, a phenol resin was subjected to a carbonization treatment by maintaining it under nitrogen flow at 900° C. for two hours. Then, the obtained carbon material was heated again in the nitrogen flow until the temperature reached 800° C., and an activation treatment was performed by introducing a mixed nitrogen gas containing 5% water vapor and 5% carbon dioxide and maintaining the temperature at 900° C. for two hours. The obtained activated carbon was ground using a ball mill until the average particle diameter became about 6 $\mu$m to obtain an activated carbon powder.

After this, the electrode forming process in which the obtained activated carbon powder, a binder material (polytetrafluoroethylene), and an organic solvent for lubrication (isopropyl alcohol (IPA)) were mixed to form a sheet was performed. That is, 84 parts by weight of obtained activated carbon powder, 8 parts by weight of polytetrafluoroethylene ("Teflon 6J" (registered trademark), a product of DuPont-Mitsui Fluorochemicals Co., Ltd.), and 8 parts by weight of acetylene black ("Denkablack" (registered trademark), a product of Denki Kagaku Kogyo KK) were mixed. Subsequently, 8 parts by weight of IPA was added to the mixture (the raw material mixing process), and mixed under applied pressure using a biaxial mixer for 8 minutes (mixing process) so that polytetrafluoroethylene was fibrillated to obtain an agglomeration. The agglomeration was then pulverized using a shearing type grinder to obtain granules having an average particle size of about 1 mm (the pulverization process). The obtained granules were formed into a sheet which was subsequently subjected to a rolling treatment to obtain a long sheet for electrode having a width of 110 mm (the sheeting-rolling process).

After this, an adhesive ("G-5780A", a product of Notape Kogyo KK) was applied to both surfaces of an aluminum foil (a current collector) having a width of 115 mm, and the sheet for electrode obtained in the previous step was adhered to both surfaces of the current collector to obtain an electrode sheet (the current collector bonding step).

Then, the electrode sheet obtained was cut to be an electrode having a length of 1200 mm, and two of such electrodes were prepared. A separator made of rayon having a thickness of 50 $\mu$m was placed between the two electrodes, and these were rolled together to form a wound body (the winding step). The obtained wound body was placed in a hollow cylindrical type capacitor container having an inner diameter of 50 mm and a height of 130 mm.

After this, the capacitor container, in which the wound body was accommodated, was placed in a vacuum dryer, and vacuum dried at a pressure of 10 Pa, and a temperature of 160° C. for 72 hours (the vacuum drying step).

Finally, an electrolyte in which 1.8 mol/L of tertiary ammonium salt (triethylmethylammonium-tetrafluoroborate) was dissolved in PC was prepared, and this was introduced into the capacitor container after the vacuum drying step (the filling step). A sealing member was attached to seal the container, and an electric double layer capacitor of Example 1 was produced.

(Manufacture of electric double layer capacitor of Example 2)

An electric double layer capacitor of Example 2 was produced using the same process as in Example 1 except that the drying time in the vacuum drying process was changed to 48 hours.

(Manufacture of electric double layer capacitor of Example 3)

An electric double layer capacitor of Example 3 was produced using the same process as in Example 1 except that the drying time in the vacuum drying process was changed to 96 hours.

(Manufacture of electric double layer capacitor of Example 4)

An electric double layer capacitor of Example 4 was produced using the same process as in Example 1 except that the drying time in the vacuum drying process was changed to 120 hours.

(Manufacture of electric double layer capacitor of Comparative Example 1)

An electric double layer capacitor of Comparative Example 1 was produced using the same process as in Example 1 except that the drying time in the vacuum drying process was changed to 24 hours.

(Analysis of amount of water in polarizable electrodes)

Figure 4:
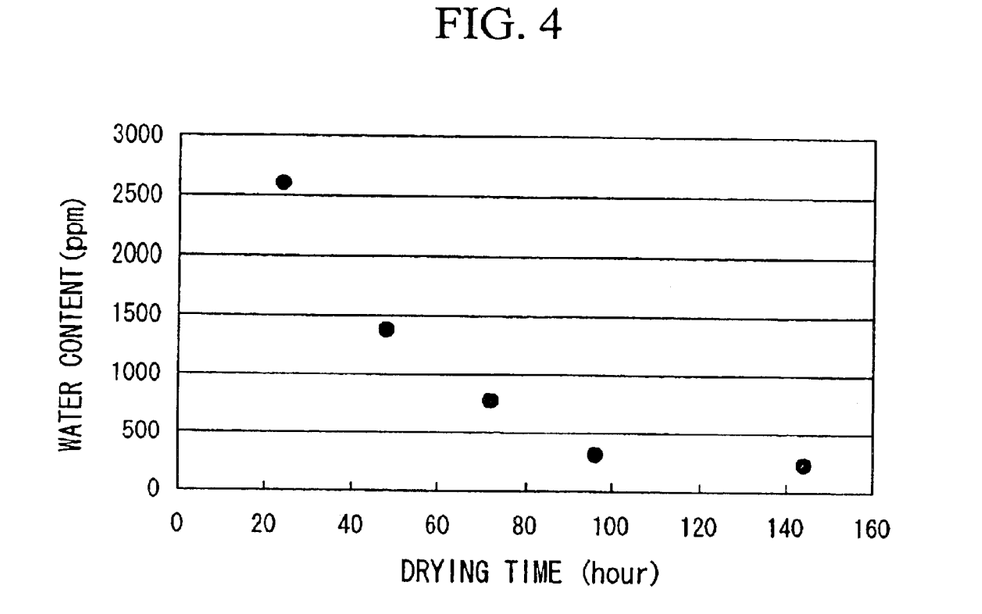
FIG. 4 is a graph showing the relationship between the amount of water remaining in polarizable electrodes and the drying time in the vacuum drying process.

A part of each of the sheet type polarizable electrodes excluding the current collector foil part was collected as a sample after the vacuum drying process. The amount of water contained in the each sample was measured by heating the sample at 300° C. for 60 minutes under a nitrogen gas flow to vaporize the water contained in the sample, and introducing the water vapor into a Karl Fischer measuring device. The results of analysis are shown in FIG. 4 and Table 1.

(Characteristic tests for electric double layer capacitor)

Figure 5:
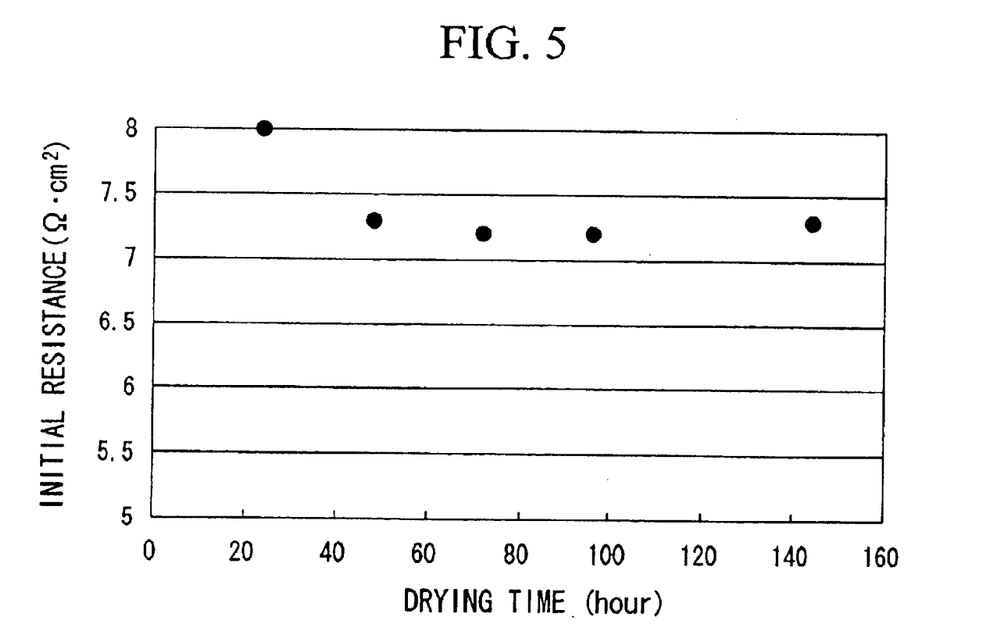
FIG. 5 is a graph showing the relationship between the initial resistance value of an internal resistance of the electric double layer capacitor and the drying time in the vacuum drying process.
Figure 6:
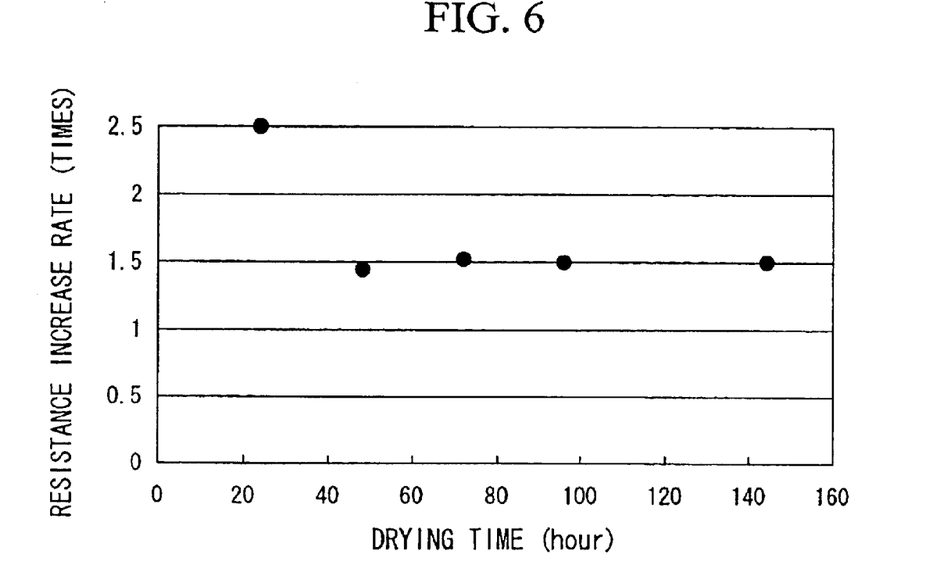
FIG. 6 is a graph showing the relationship between the increase rate of the resistance of the electric double layer capacitor and the drying time in the vacuum drying process.

The resistance value of an initial internal resistance of each of the above mentioned electric double layer capacitors of Examples 1 to 4 and Comparative Example 1 was measured after performing an aging treatment at 60° C. Each of the capacitors was charged at a charging current of 30 A until the terminal voltage reached 2.5 V. The terminal voltage was maintained at 2.5V and the resistance value after standing for 1000 hours at 45° C. was measured. Also, the rate of increase of the resistance value from the initial stage to the end of 1000 hours was calculated. The results are shown in FIGS. 5 and 6 and Table 2.

(Strength test for polarizable electrode)

Figure 7:
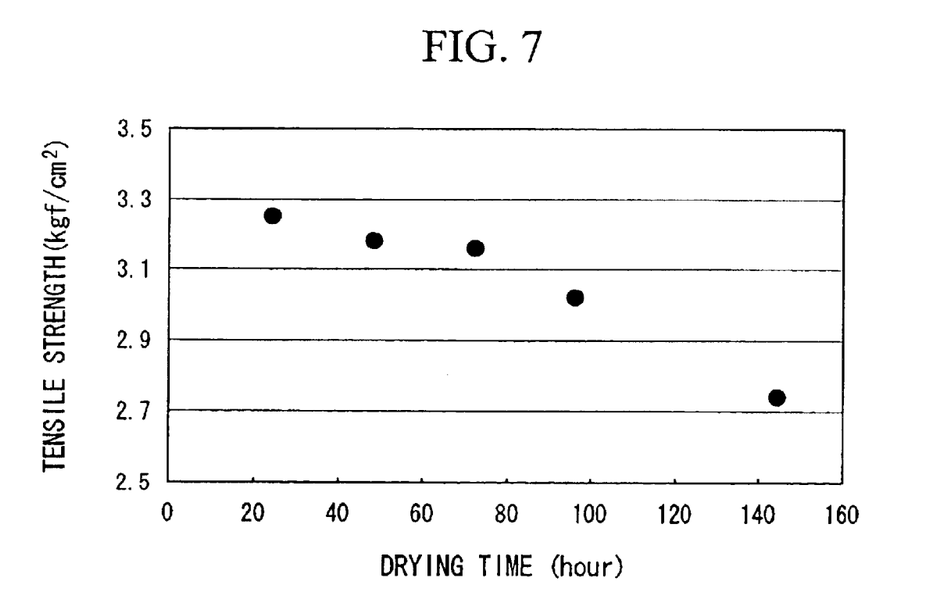
FIG. 7 is a graph showing the relationship between the tensile strength of polarizable electrodes and the drying time in the vacuum drying process.

A part of each of the polarizable electrodes was collected as a sample after the vacuum drying process and was heated at 300° C. for 60 minutes under the nitrogen gas flow. After this, each of the samples was cut into a sheet having a width of 15 mm and a length of 100 mm, and this was used to measure the tensile strength thereof using a tensile strength measuring device. The results are shown in FIG. 7 and Table 3.

(Analysis of amount of water)

FIG. 4 shows the relationship between the amount of water which remained in the polarizable electrode after the vacuum drying process and the duration of the vacuum drying process.

As shown in FIG. 4, it is clear that the amount of water decreases as the duration increases. In particular, the amount of water after a drying time of 48 hours decreased to 1380 ppm which is lower than the above mentioned 1500 ppm. Also, after a drying time 144 hours, the amount of water remaining decreased to 240 ppm, which is lower than the above mentioned 250 ppm. This shows that further decrease of the amount of water contained in the electrode is difficult due to the absorption property of the activated carbon.

TABLE 1

|  | Drying Time (hours) | Water Content (ppm) |
| --- | --- | --- |
| Comp. Ex. 1 | 24 | 2600 |
| Ex. 1 | 72 | 780 |
| Ex. 2 | 48 | 1380 |
| Ex. 3 | 96 | 320 |
| Ex. 4 | 144 | 240 |

(Characteristics of electric double layer capacitor)

FIG. 5 shows the relationship between the initial resistance value of the internal resistance of the capacitor and the duration of the vacuum drying process, and FIG. 6 shows the relationship between the rate of increase of the resistance after 1000 hours and the duration of the vacuum drying process.

As shown in FIG. 5, the initial resistance value decreases from about 8.0 $\Omega cm^2$ to about 7.3 $\Omega cm^2$ when the drying time is 42 hours or longer, and thereafter, the initial value does not significantly change and becomes constant. Also, as shown in FIG. 6, when the drying time is 42 hours or longer, the resistance increasing rate is significantly reduced to about 1.5 times from about 2.5 times, and it becomes constant thereafter.

In consideration of the results shown in FIGS. 5 and 6 and the analysis of the amount of water shown in FIG. 4, it is clear that the initial resistance value of the capacitor and the increase rate of the resistance after 1000 hours can be significantly lowered if the amount to water remaining in the polarizable electrode is 1500 ppm or less.

The reason for this is believed to be that the electric double layer is sufficiently Formed in the fine pores of the activated carbon powder and the diffusive resistance between the activated carbon powder and the electrolyte is reduced since the amount of water which remains in the polarizable electrode is decreased.

TABLE 2

|  | Drying Time (hours) | Initial Resistance ($\Omega cm^2$) | Resistance Increasing Rate (times) |
| --- | --- | --- | --- |
| Comp. Ex. 1 | 24 | 8.0 | 2.5 |
| Ex. 1 | 72 | 7.2 | 1.52 |
| Ex. 2 | 48 | 7.3 | 1.45 |

TABLE 2-continued

|  | Drying Time (hours) | Initial Resistance ($\Omega cm^2$) | Resistance Increasing Rate (times) |
| --- | --- | --- | --- |
| Ex. 3 | 96 | 7.2 | 1.50 |
| Ex. 4 | 144 | 7.3 | 1.50 |

(Tensile strength of the electrode)

FIG. 7 shows the relationship between the strength of the polarizable electrode and the duration of the vacuum drying process. Note that the unit used for expressing the tensile strength in FIG. 7 and this specification is based on 1 $kgf/cm^2 = 98066.5$ Pa.

As shown in FIG. 7, the tensile strength is reduced to about 2.74 $kgf/cm^2$ when the drying time is 144 hours or longer. The reason for this is believed to be that the fibers of polytelrafluoroethylene used as the binder material were disrupted by the drying process over many hours, and the binding force to the activated carbon was lowered. These results show that it is not preferable to continue the drying process for a long period.

TABLE 3

|  | Drying Time (hours) | Tensile Strength ($kgf/cm^2$) |
| --- | --- | --- |
| Comp. Ex. 1 | 24 | 3.25 |
| Ex. 1 | 72 | 3.16 |
| Ex. 2 | 48 | 3.18 |
| Ex. 3 | 96 | 3.02 |
| Ex. 4 | 144 | 2.74 |

Example 2

Effect of Performing Continuous Drying Process (Manufacture of electric double layer capacitor of Example 5)

An electric double layer capacitor of Example 5 was produced using the same process as in Example 1, except that the electrode sheet after the current collector bonding process was introduced into a hot blast continuous drying furnace to carry out a continuous drying process under the conditions of blowing hot air at 150° C. at the rate of 10 L/min and that the drying time in the vacuum drying process was changed to 48 hours.

(Manufacture of electric double layer capacitor of Comparative Example 2) An electric double layer capacitor of Comparative Example 2 was produced using the same process as in Example 1 except that the drying time in the vacuum drying process was changed to 48 hours.

The amount of water contained in the capacitor of Example 5 and Comparative Example 2 was analyzed using a Karl Fischer device as in Example 1. Also, analysis of organic compounds was conducted using a gas chromatograph. The results for the polarizable electrode of Example 5 are shown in Table 4. Note that the units of the numbers in Table 4 is ppm.

Moreover, the initial resistance value and the increase rate of the resistance were measured for Example 5 and Comparative Example 2 in the same manner as in Example 1. The results are shown in Table 5. Note that the units of the initial resistance value and that of the rate of increase of the resistance used in Table 5 are $\Omega cm^2$ and times, respectively.

Furthermore, analysis using a gas chromatography was carried out by filling a part of the polarizable electrode after the vacuum drying process to a sample tube of a heat desorption device ("ATD400", a product of Perkin-Elmer Co.), heating the tube at 350° C. for 10 minutes under the flow of helium gas, collecting vaporized components in an internal trap, and introducing the components into a gas chromatograph. A column used for the gas chromatography was SPB-1 (a product of Spelco Co.; length=60 m, internal diameter=0.25 mm, and thickness=25 $\mu$m). A flame ionization detector (FID) was used for the detection, and the quantitative determination was calibrated using pentene based on the assumption that the strength of a peak detected by the FID is proportional to the number of carbon atoms. Note that the qualitative analysis of each peak was performed using mass analysis.

TABLE 4

|  | Before drying sheet (ppm) | After drying sheet (ppm) | Before vacuum drying (ppm) | After vacuum drying (ppm) |
|---|---|---|---|---|
| Isopropyl alcohol | 15000 | 440 | 436 | 67 |
| Diisopropyl ether | 0 | 12 | 12 | 28 |
| Diisopropyl acetate | 0 | 15 | 14 | 30 |
| Propylene | 0 | 16 | 17 | 37 |
| Ethanol | 120 | 25 | 86 | 13 |
| Acetone | 357 | 72 | 170 | 59 |
| Acetaldehyde | 12 | 45 | 65 | 10 |

TABLE 5

|  | Initial Resistance ($\Omega cm^2$) | Resistance Increasing Rate (times) |
|---|---|---|
| Ex. 5 | 6.1 | 1.23 |
| Comp. Ex. 2 | 7.3 | 1.45 |

As shown in Table 4, the main components of the detected organic compounds were isopropyl alcohol (IPA), diisopropyl ether (DIPE), propylene, isopropyl acetate, ethanol, acetone, and acetaldehyde. It is believed that DIPE, propylene, and isopropyl acetate were formed when isopropyl alcohol used as the organic solvent for the mixing process was oxidized, dehydrated and condensed, etc. during the continuous drying process and the vacuum drying process. Also, it is believed that ethanol and acetone are the components which were absorbed by the activated carbon from the atmosphere in the manufacturing process for the capacitor. Moreover, it is believed that acetaldehyde was produced by the oxidation of ethanol.

As shown in Table 4, the amount of each organic compounds decreases after carrying out the continuous drying and vacuum drying processes.

Also, as shown in Table 5, the initial resistance value and the increase rate of the resistance of the capacitor of Example 5 are lower than those of the capacitor of Comparative Example 2. Accordingly, it is clear that the continuous drying process has an effect of removing the organic compounds.

Figure 8:
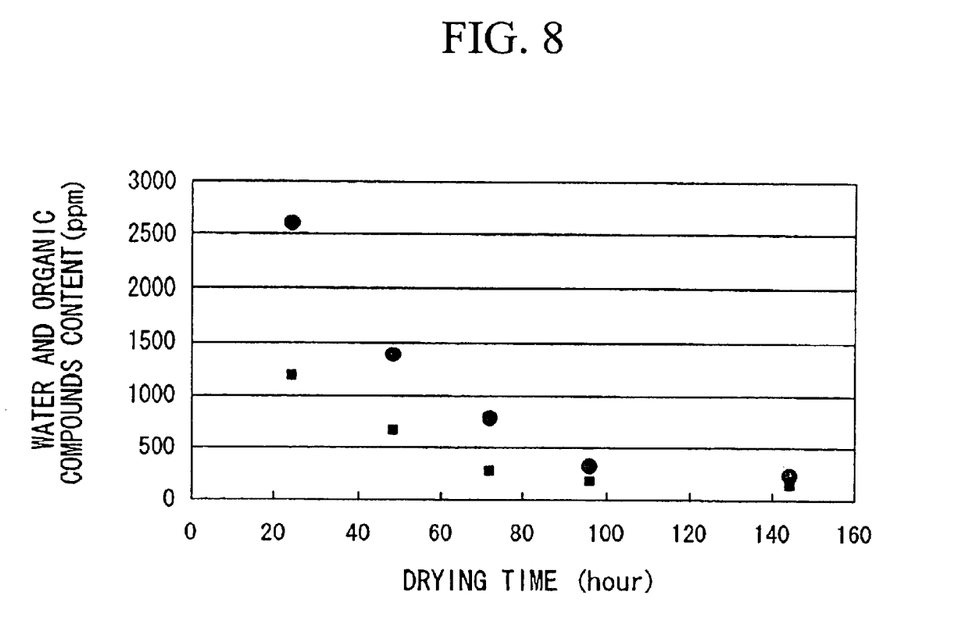
FIG. 8 is a graph showing the relationship between the total amount of organic compounds and water contained in polarizable electrodes after the vacuum drying process and the drying time in the vacuum drying process when the continuous drying process is not carried out.

Moreover, polarizable electrodes were produced in the same manner as in Comparative Example 2 except that the drying time in the vacuum drying process was changed to 24, 72, 96, and 144 hours, and the total amount of organic compounds and water contained in each of the polarizable electrodes was analyzed. FIG. 8 shows a dependency of the total amount of organic compounds and water contained in the polarizable electrode after the vacuum drying process to the vacuum drying time when the continuous drying process was not performed. Note that in FIGS. 8 and 9, the plot indicated by black dots indicates the amount of water, and the plot indicated by the black circles indicates the amount of organic compounds.

Figure 9:
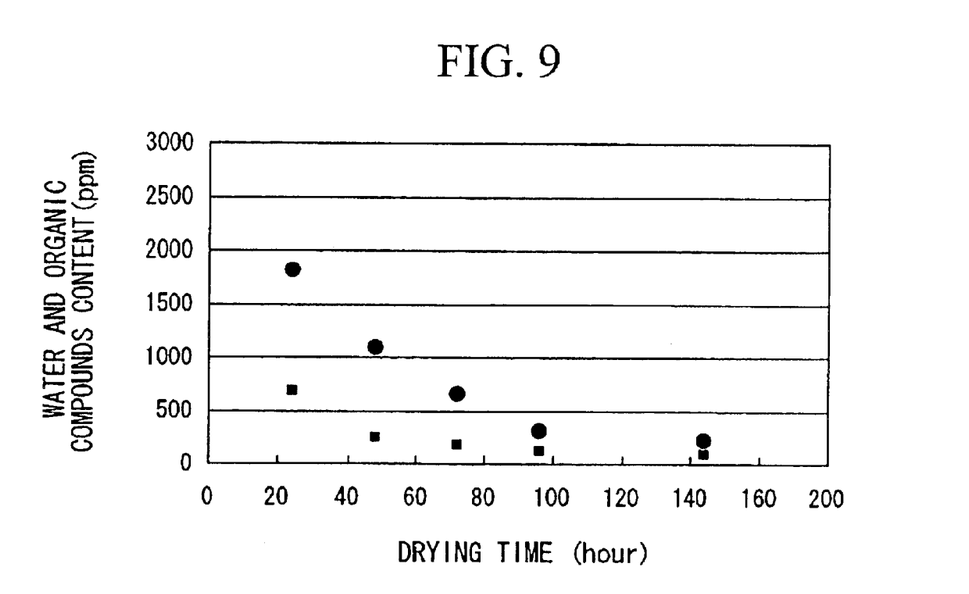
FIG. 9 is a graph showing the relationship between the total amount of organic compounds and water contained in polarizable electrodes after the vacuum drying process and the drying time in the vacuum drying process when the continuous drying process is carried out.

Likewise, polarizable electrodes were produced in the same manner as in Example 5 except that the drying time in the vacuum drying process was changed to 24, 72, 96, and 144 hours, and the total amount of organic compounds and water contained in each of the polarizable electrodes was analyzed. FIG. 9 shows a dependency of the total amount of organic compounds and water contained in the polarizable electrode after the vacuum drying process to the vacuum drying time when the continuous drying process was performed.

As shown in FIG. 9, the amount of water was reduced to below 1500 ppm after the vacuum drying process of 48 hours when the continuous drying process was carried out. On the other hand, as shown in FIG. 8, the amount of water was also educed to below 1500 ppm after the vacuum drying process of 48 hours when the continuous drying process was not carried out. However, by comparing the curves shown in FIGS. 8 and 9, it is apparent that the curve shown in FIG. 9 in which the continuous drying process was performed is completely below the curve shown in FIG. 8. Accordingly, it is understood that the time required for the vacuum drying process can be shortened if the continuous drying process is carried out.

Furthermore, as shown in FIG. 9, the amount of organic compounds was reduced to below 300 ppm after the vacuum drying process of 48 hours when the continuous drying process was carried out. On the other hand, as shown in FIG. 8, the amount of organic compounds was reduced to below 300 ppm after the vacuum drying process of 72 hours when the continuous drying process was not carried out. Accordingly, it is understood that the time required for the vacuum drying process can be reduced if the continuous drying process is carried out.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A polarizable electrode for an electric double layer capacitor, comprising:

an activated carbon powder; and a binder material mixed with the activated carbon, wherein an amount of water contained in said polarizable electrode is 1500 ppm or smaller with respect to a weight of said polarizable electrode.

2. A polarizable electrode for an electric double layer capacitor according to claim 1, wherein the amount of water contained in said polarizable electrode is in a range from 250 ppm to 1500 ppm with respect to the weight of said polarizable electrode.

3. A method for manufacturing a polarizable electrode for an electric double layer capacitor, comprising the steps of:

mixing an activated carbon powder and a binder material with an organic solvent to form a polarizable electrode; and removing water which remains in said polarizable electrode by vacuum drying until an amount of water contained in said electrode is reduced to 1500 ppm or less with respect to a weight of said polarizable electrode.

4. A method for manufacturing an electric double layer capacitor including a pair of polarizable electrodes formed by an activated carbon powder and a binder material, a separator disposed between said pair of polarizable electrodes, and an electrolyte, said method comprising the steps of:

mixing said activated carbon powder and said binder material with an organic solvent to form said pair of polarizable electrodes;

placing said separator between said pair of polarizable electrodes and producing a wound body by winding said separator together with said pair of polarizable electrodes;

after disposing said wound body in a capacitor container, removing water remaining in said wound body by vacuum drying until an amount of water contained in said wound body is reduced to 1500 ppm or less with respect to a weight of said polarizable electrode; and introducing said electrolyte into said capacitor container.

* * * * *